(12) United States Patent
Lo et al.

(10) Patent No.: US 11,543,297 B2
(45) Date of Patent: Jan. 3, 2023

(54) SENSING DEVICES

(71) Applicant: Industrial Technology Research Institute, Hsinchu (TW)

(72) Inventors: Ying-Che Lo, Tainan (TW); Yu-Sheng Lin, Tainan (TW); Ting-Hao Hsiao, Chiayi County (TW); Bor-Shiun Lee, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 286 days.

(21) Appl. No.: 16/886,036

(22) Filed: May 28, 2020

(65) Prior Publication Data

US 2021/0018376 A1    Jan. 21, 2021

(30) Foreign Application Priority Data

Jul. 19, 2019   (TW) .................................. 108125564

(51) Int. Cl.
*G01J 5/22*      (2006.01)
*G01K 7/22*      (2006.01)
(Continued)

(52) U.S. Cl.
CPC .................. *G01J 5/22* (2013.01); *G01D 5/24* (2013.01); *G01K 7/203* (2013.01); *G01K 7/22* (2013.01)

(58) Field of Classification Search
CPC .......... G01K 7/22; G01K 7/203; G01K 7/245; G01D 5/24; G01J 5/22; G01J 5/24
See application file for complete search history.

(56) References Cited

U.S. PATENT DOCUMENTS 6,194,903 B1 *   2/2001   Schulz ............... G01R 27/2605
                                              324/661
6,249,002 B1 *   6/2001   Butler .................. H04N 5/3651
                                              250/370.08

(Continued)

FOREIGN PATENT DOCUMENTS

CN          1253285 A       5/2000
CN        101419094 A       4/2009
(Continued)

OTHER PUBLICATIONS

Taiwan Patent Office, Office Action, Patent Application Serial No. 108125564, dated May 4, 2020, Taiwan.
(Continued)

*Primary Examiner* — Akm Zakaria (57) ABSTRACT

A sensing device is provided. The sensing device includes a plurality of infrared thermosensitive elements and a plurality of resistor-capacitor (RC) oscillators. The plurality of infrared thermosensitive elements are arranged in an array. Each of the plurality of infrared thermosensitive elements has a resistance value which changes with a temperature of the infrared thermosensitive element by absorbing infrared radiation and generates a sensing voltage corresponding to the resistance value. The plurality of RC oscillators are coupled to the plurality of infrared thermosensitive elements to receive the corresponding sensing values, respectively. Each of the plurality of RC oscillators generates a digital sensing signal according to the corresponding sensing value to indicate the temperature of the corresponding infrared thermosensitive element. Each of the plurality of RC oscillators is disposed under the corresponding infrared thermosensitive element.

13 Claims, 8 Drawing Sheets

(51) Int. Cl.
*G01K 7/20* (2006.01)
*G01D 5/24* (2006.01)

(56) References Cited

U.S. PATENT DOCUMENTS

| | | | |
|---|---|---|---|
| 6,791,087 B1 | 9/2004 | Okumura | |
| 6,812,465 B2 | 11/2004 | Parrish et al. | |
| 7,309,865 B2 | 12/2007 | Ikushima et al. | |
| 8,232,525 B2 | 7/2012 | Legras | |
| 9,142,363 B2 | 9/2015 | Heim | |
| 9,163,992 B2 | 10/2015 | Furukawa et al. | |
| 9,163,996 B2 | 10/2015 | Lv et al. | |
| 9,383,282 B2 | 7/2016 | Besling et al. | |
| 9,411,474 B2 | 8/2016 | Rauhala et al. | |
| 9,525,417 B2 | 12/2016 | Inada et al. | |
| 9,797,750 B2 | 10/2017 | Moon et al. | |
| 2002/0105436 A1* | 8/2002 | Bell | G01K 7/245 374/170 |
| 2003/0133491 A1 | 7/2003 | Shih | |
| 2006/0261819 A1 | 11/2006 | Liu et al. | |
| 2006/0262829 A1 | 11/2006 | Manlove et al. | |
| 2007/0215805 A1* | 9/2007 | Boie | G01J 1/04 250/338.1 |
| 2010/0133438 A1 | 6/2010 | Gardette et al. | |
| 2013/0341521 A1* | 12/2013 | Fechner | G01T 7/005 250/336.1 |

FOREIGN PATENT DOCUMENTS

| | | |
|---|---|---|
| CN | 101458125 A | 6/2009 |
| CN | 101634838 A | 1/2010 |
| CN | 101676697 A | 3/2010 |
| CN | 1725002 B | 4/2013 |
| CN | 104075821 A | 10/2014 |
| CN | 105628243 A | 6/2016 |
| CN | 103776544 B | 7/2016 |
| CN | 103441763 B | 8/2016 |
| CN | 106136842 A | 11/2016 |
| CN | 104251741 B | 7/2017 |
| CN | 107727243 A | 2/2018 |
| CN | 108647656 A | 10/2018 |
| CN | 109828001 A | 5/2019 |
| GB | 1149561 A | 4/1969 |
| TW | 466107 B | 12/2001 |
| TW | 522601 B | 3/2003 |
| TW | 580568 B | 3/2004 |
| TW | I279072 B | 4/2007 |
| TW | I438411 B | 5/2014 |
| TW | I528705 B | 4/2016 |
| WO | WO95020750 A1 | 8/1995 |

OTHER PUBLICATIONS

Ilan, Elad, et al., "A 3 Mpixel ROIC with 10um Pixel Pitch and 120Hz Frame Rate Digital Output", Proc. of SPIE, 2013, pp. 1117-1122, US.

Svard, Daniel, et al., "A readout IC for an uncooled microbolometer infrared FPA with on-chip self-heating compensation in 0.35 um CMOS", Analog Integrated Circuits and Signal Processing, 2013, pp. 29-44, Springer, US.

Ringh, Ulf, et al. "CMOS analog-to-digital conversion for uncooled bolometer infrared detector arrays", Proc. of SPIE, 1995, pp. 88-97, SPIE, US.

Ramakrishna, M.V.S., et al., "Highly sensitive infrared temperature sensor using self-heating compensated microbolometers", Sensors and Actuators A, 2000, pp. 122-127, Elsevier, US.

Parrish, William J. and James T. Woolaway. "Improvements in uncooled systems using bias equalization", Proc. of SPIE, 1999, pp. 748-755, SPIE, US.

Lv, Jian, et al., "Model-Based Low-Noise Readout Integrated Circuit Design for Uncooled Microbolometers", IEEE Sensors Journal, Apr. 2013, pp. 1207-1215, vol. 13, No. 4,IEEE, US.

Jo, Young Min, et al., "TEC-Less ROIC With Self-Bias Equalization for Microbolometer FPA", IEEE Sensors Journal, Jan. 2015, pp. 82-88, vol. 15, No. 1, IEEE, US.

Zhige, Zou, et al. "Relaxation Oscillator Application for the High Accuracy Clinical Thermometer Chip" Research & Progress of SSE, Sep. 2008, vol. 28, No. 3, 5 pges, China.

China Patent Office, Office Action, Patent Application Serial No. 201910800436.1, dated May 31, 2021, China.

Homes, J. Fred and Badih J. Rask. "Optimum optical local-oscillator power levels for coherent detection with photodiodes" Applied Optics, vol. 34, No. 6, Feb. 1995, 7 pages, Applied Optics, US.

China Patent Office, Office Action, Patent Application Serial No. 201910800436.1, dated Jan. 21, 2022, China.

China Patent Office, Notice of Allowance, Patent Application Serial No. 201910800436.1, dated Jun. 6, 2022, China.

* cited by examiner

SENSING DEVICES

CROSS REFERENCE TO RELATED APPLICATIONS

This application claims priority of Taiwan Patent Application No. 108125564, filed on Jul. 19, 2019, the entirety of which is incorporated by reference herein.

BACKGROUND OF THE INVENTION

Field of the Invention

The invention relates to a sensing device, and more particularly to a temperature sensing device with thermistor bolometers.

Description of the Related Art

Infrared thermal imaging is widely used in thermal imaging devices, personal thermal imaging devices, night vision and security monitoring devices, and smart phones. Sensing devices for detecting infrared thermal images typically have infrared thermosensitive elements, such as thermistor bolometers, whose resistance values change with temperature. In a sensing device having a thermistor bolometer, a detection circuit for sensing a change in a resistance value of the thermistor bolometer generally outputs an analog voltage/current signal, and thus an analog-to-digital converter is required to convert the voltage/current signal to a digital signal which is processed by a processor at the back end. In addition, in order to avoid saturation of the following readout amplifier, multiple digital-to-analog converters are needed to calibrate the non-uniform resistance of the thermistor bolometer. Furthermore, waiting the thermal response of the thermistor bolometer to reach at steady value limits the scanning speed of the thermistor bolometer array as well as the frame rate of the infrared thermal image sensing devices. The traditional techniques with above problems increase the circuit fabrication cost of the sensing device, increase the calibration complexity, decrease the frame rate, and the like.

BRIEF SUMMARY OF THE INVENTION

Accordingly, the present invention provides a sensing device which comprises a thermistor bolometer that directly generates a signal in a digital form through a resistor-capacitor (RC) oscillator to represent temperature and has a better sensing resolution and the ability to measure high-speed targets.

An exemplary embodiment of a sensing device is provided. The sensing device comprises a plurality of infrared thermosensitive elements and a plurality of resistor-capacitor (RC) oscillators. The plurality of infrared thermosensitive elements are arranged in an array. Each of the plurality of infrared thermosensitive elements has a resistance value which changes with the temperature of the infrared thermosensitive element and generates a sensing voltage corresponding to the resistance value. The plurality of RC oscillators are coupled to the plurality of infrared thermosensitive elements to receive the corresponding sensing values, respectively. Each of the plurality of RC oscillators generates a digital sensing signal according to the corresponding sensing value to indicate the temperature of the corresponding infrared thermosensitive element. Each of the plurality of RC oscillators is disposed under the corresponding infrared thermosensitive element.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
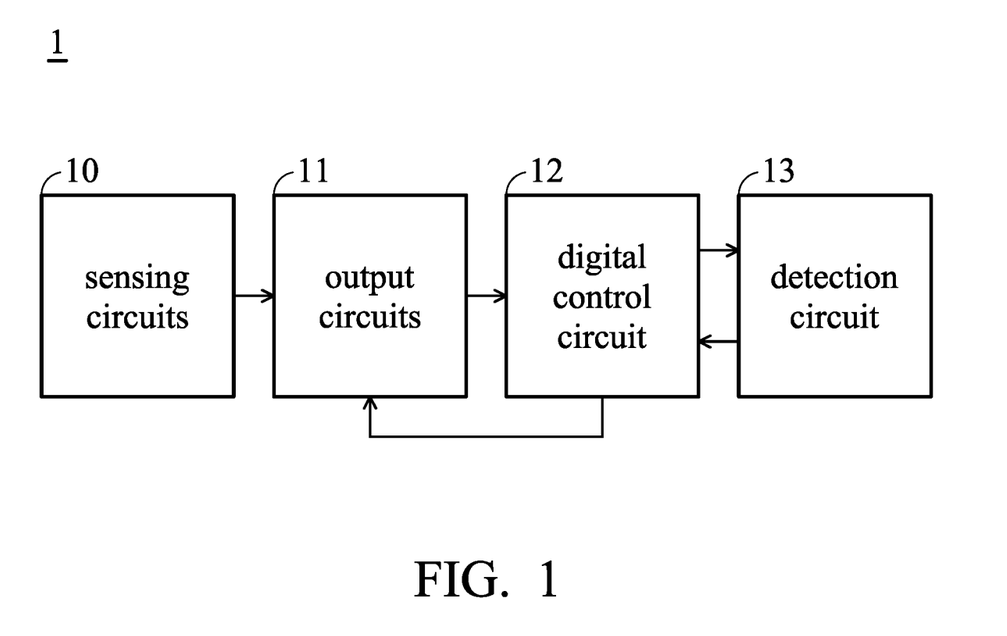
FIG. 1 shows one exemplary embodiment of a sensing device.
Figure 2:
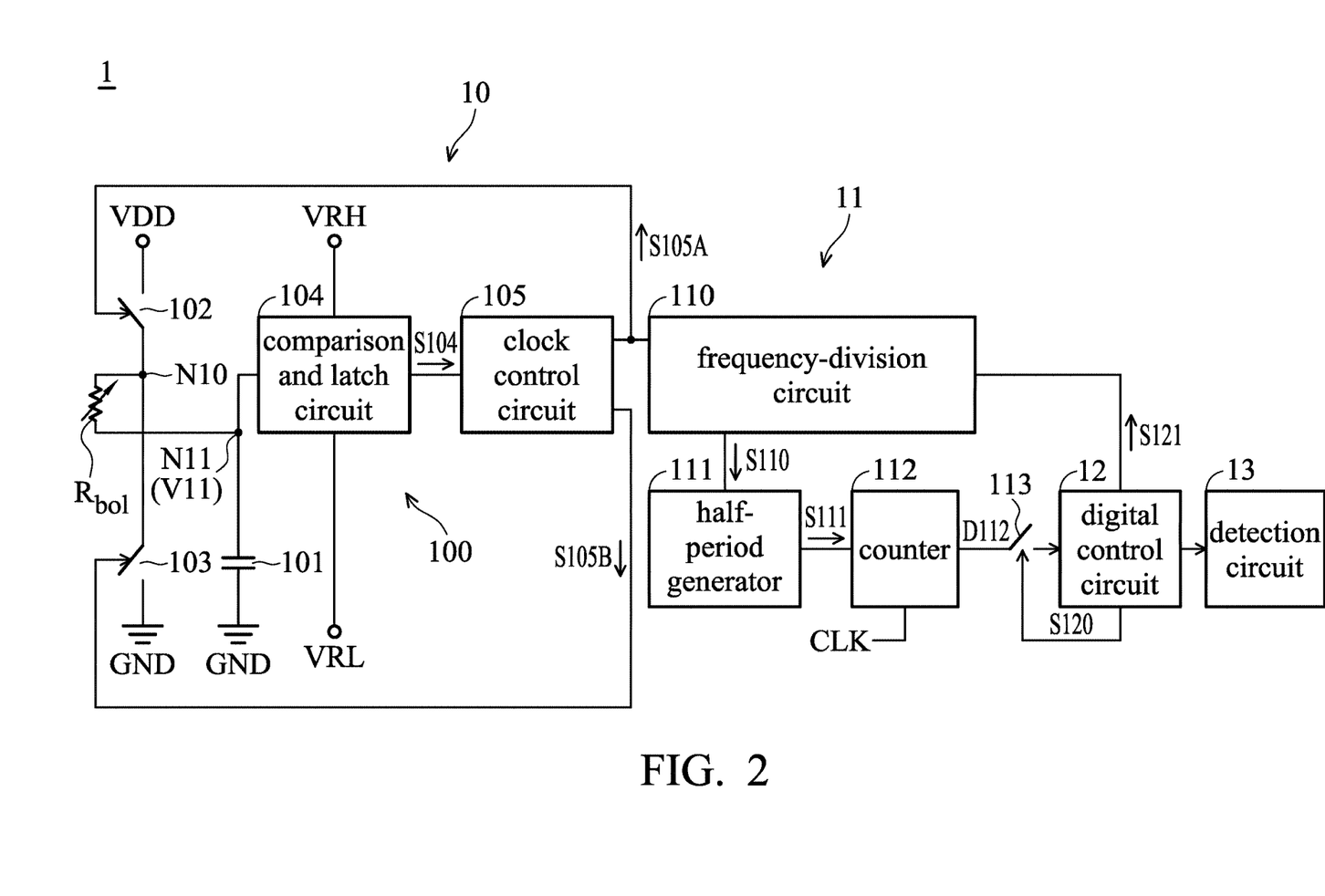
FIG. 2 shows another exemplary embodiment of a sensing device.
Figure 3A:
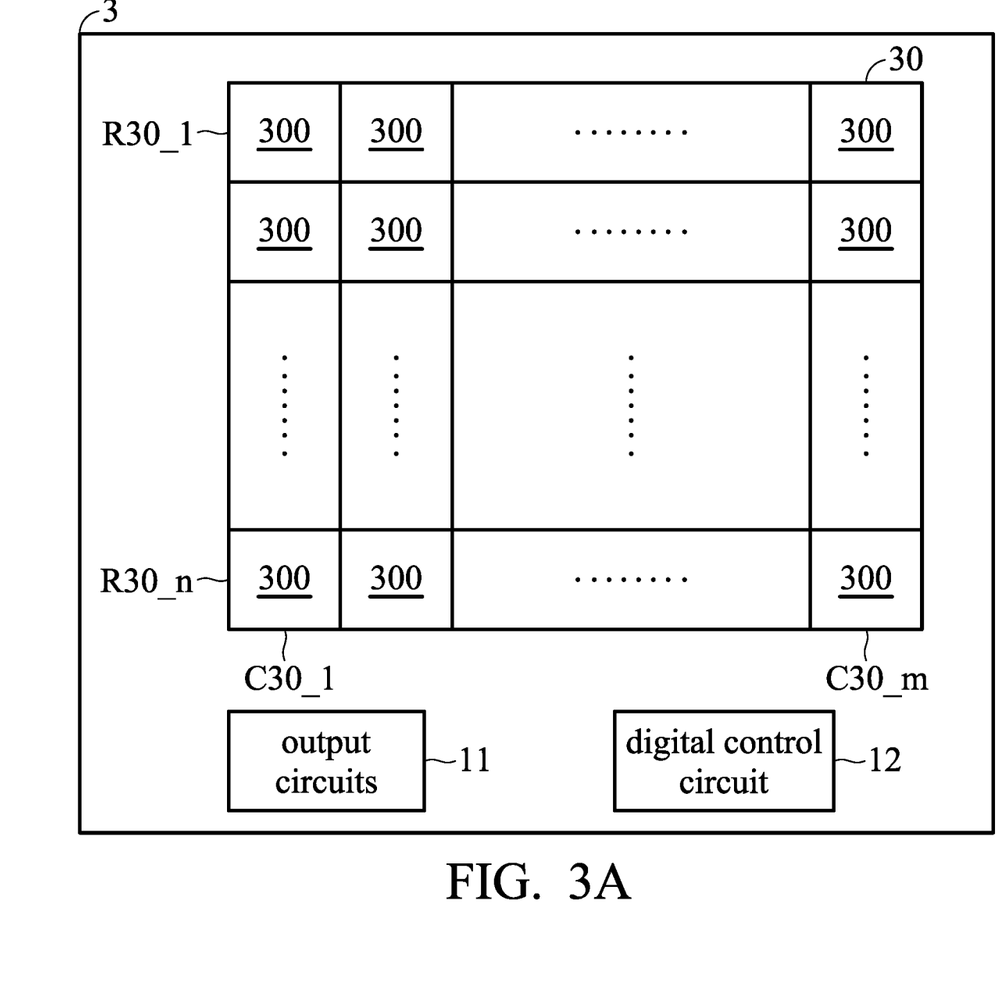
FIG. 3A is a schematic diagram showing arrangement of a sensing array of a sensing device on a substrate according to an exemplary embodiment of the invention.
Figure 3B:
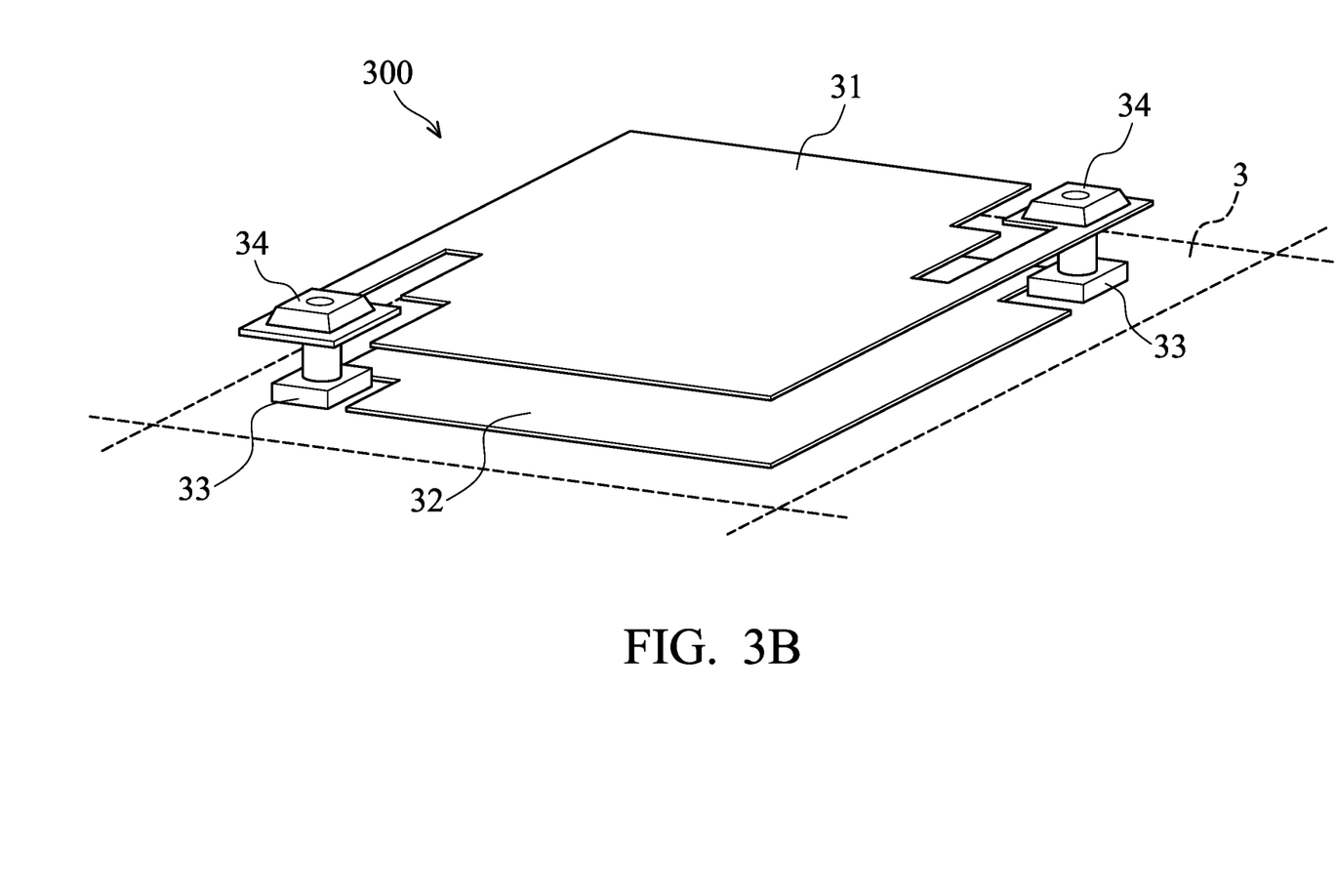
FIG. 3B is a schematic diagram showing an arrangement relationship between a semiconductor layer of a thermistor bolometer and a substrate for each pixel according to an exemplary embodiment of the present invention.

FIG. 1 shows one exemplary embodiment of a sensing device. Referring to FIG. 1, a sensing device 1 can be placed in a space and comprises a plurality of sensing circuits 10, a plurality of digital output circuits 11, a digital control circuit 12, and a detection circuit 13. The sensing circuits 10 are configured to sense temperature of a plurality of thermistor bolometers and directly output a plurality of digital sensing signals in a digital form. The digital output circuits 11 receive the digital sensing signals and generate a plurality of half-period count values according to the received digital sensing signals, respectively. The digital control circuit 12 receives the half-period count values and generates a plurality of temperature values according to the received half-period count values. The detection circuit 13 receives the temperature values from the digital control circuit 12 and generates an infrared thermal image of at least one to-be-detected object in the space according to the temperature values. Additionally, through the operation of the sensing device 1 during a plurality of frames, the detection circuit 13 can determine the thermal dynamic characteristics of the image of the object, such as the moving direction of the object, according to the sensed temperature values of the object. The structure and operation of the sensing device 1 of the embodiment of the present invention will be further described below through FIGS. 2~7. As shown in FIG. 2, for convenience of description, it only shows a set of one sensing circuit 10 and one corresponding digital output circuit 11, which represents a sensing operation and structure of one infrared thermosensitive element. The other infrared thermosensitive elements, the other sensing circuits 10, and the other digital output circuits 11 have the same structure shown in FIG. 2. The sensing circuit 10 comprises an infrared thermosensitive element and a resistance-capacitor (RC) oscillator 100. In this embodiment, the infrared thermosensitive element is implemented by a thermistor bolometer $R_{bol}$. When the sensing material of the thermistor bolometer $R_{bol}$ absorbs infrared radiation, the temperature of the thermistor bolometer $R_{bol}$ rises and resistance value thereof changes with temperature. Taking the positive temperature coefficient as an example, the resistance value of the thermistor bolometer $R_{bol}$ increases as the temperature increases. The RC oscillator 100 comprises a capacitor 101, switches 102 and 103, a comparison and latch circuit 104, and a clock control circuit 105. The digital output circuit 11 comprises a frequency-division circuit 110, a half-period generator 111, a counter 112, and a switch 113. Referring to FIG. 3A, a sensing array 30 is disposed on a substrate 3 of the sensing device 1. The sensing array 30 is divided into a plurality of digital pixels 300, which are respectively arranged in a plurality of columns (for example, a vertical direction) C30_1 to C30_m and a plurality of rows (for example, a horizontal direction) R30_1 to R30_m. In this embodiment, each digital pixel 300 corresponds to one sensing circuit 10. In detail, for each sensing circuit 10, all of its elements are disposed in the region corresponding to the digital pixel 300. FIG. 3B shows the arrangement of the elements in the region of one digital pixel 300. Referring to FIG. 3B, a semiconductor layer 31 is used to form the thermistor bolometer $R_{bol}$. The semiconductor layer 31 is stacked above the substrate 3 by bonding the metal connection post 34 to the metal pad 33 of the substrate 3. As shown in FIG. 3B, a reflective layer 32 is formed between the semiconductor layer 31 and the substrate 3. The corresponding RC oscillator circuit is disposed between the reflective layer 32 and the substrate 3. From the arrangement shown in FIG. 3B, the RC oscillator 100 is disposed below the thermistor bolometer $R_{bol}$. Further, the digital output circuits 11 and the digital control circuit 12 are disposed on the substrate 3. FIG. 3A only shows a schematic diagram in which the digital output circuits 11 and the digital control circuit 12 are disposed on the substrate 3. In an embodiment, the digital output circuits 11 are centrally disposed and disposed on one side of the sensing array 30. In another embodiment, the digital output circuits 11 are discretely disposed and disposed around the sensing array 30. In other embodiments, the positions of the digital output circuits 11 on the substrate 3 can be determined according to the circuit design, and is not limited to the above.

Figure 4:
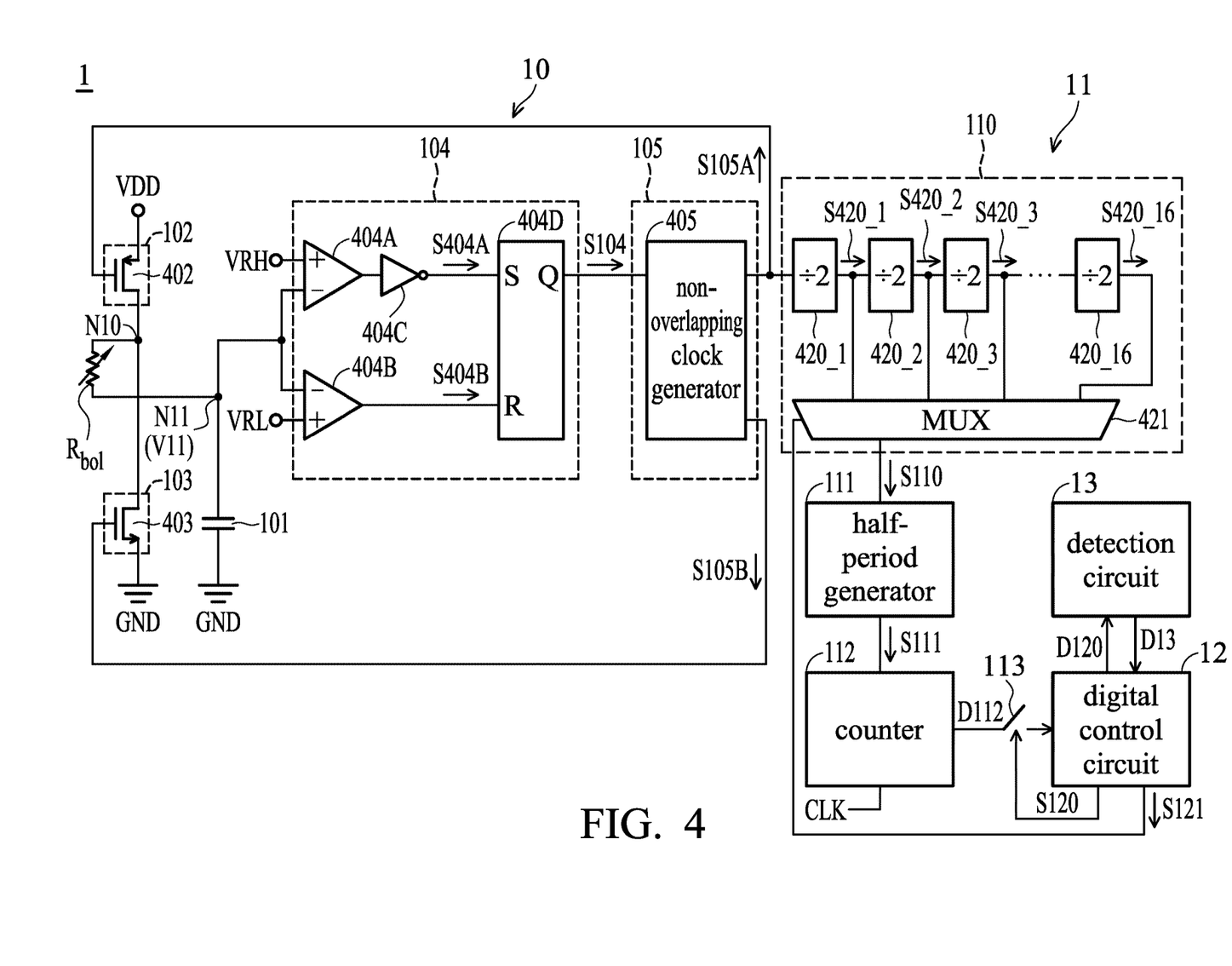
FIG. 4 shows another exemplary embodiment of a sensing device.
Figure 5:
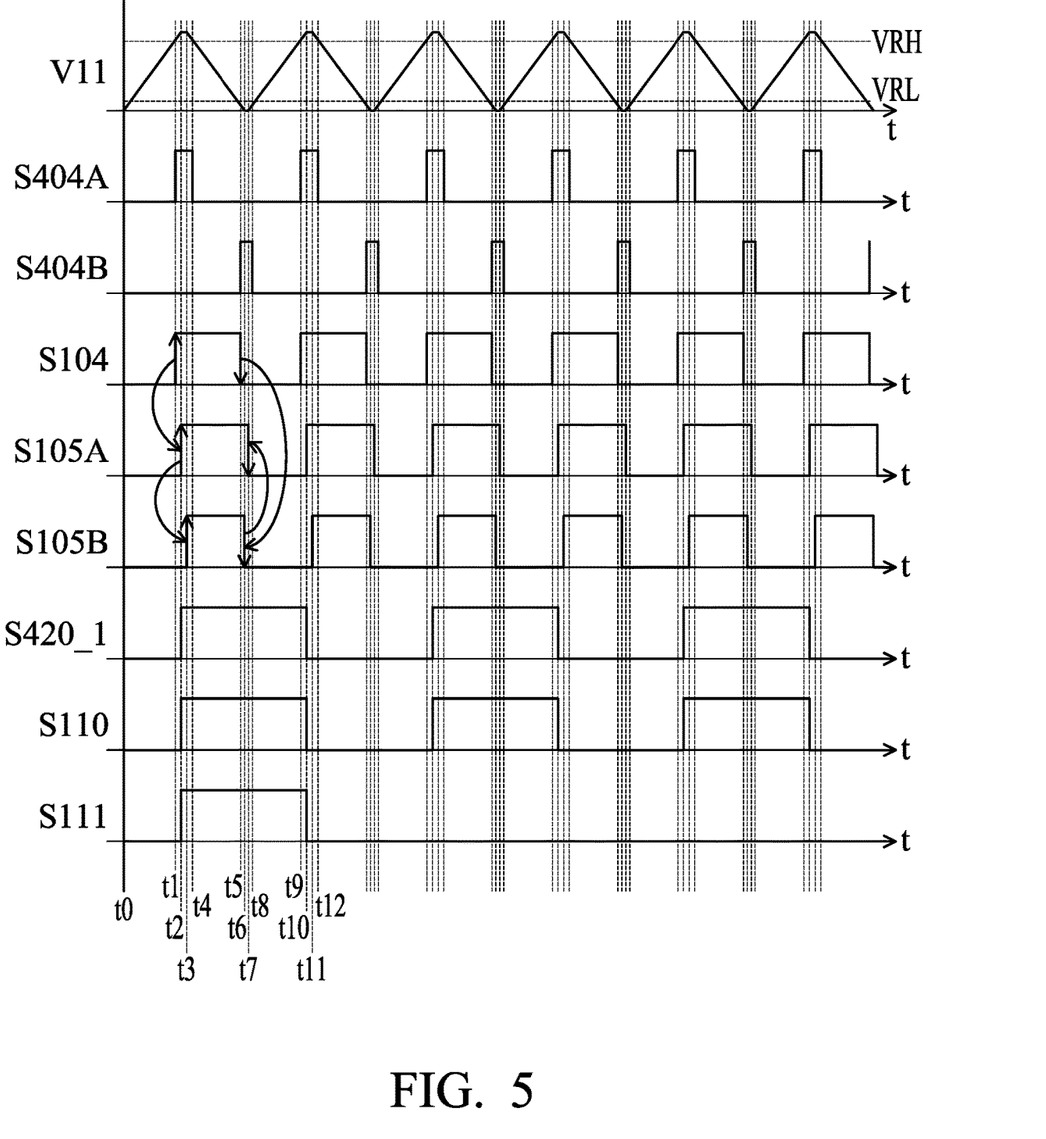
FIG. 5 shows timing chart of main signals of a sensing device according to an exemplary embodiment of the present invention.

Referring to FIG. 2 again, the thermistor bolometer $R_{bol}$ is coupled between nodes N10 and N11, and the capacitor 101 is coupled between the node N11 and the ground GND. Therefore, the thermistor bolometer $R_{bol}$ and the capacitor 101 form an RC charging or discharging signal path that controlled by the switches 102 and 103. One terminal of the switch 102 is coupled to a voltage source VDD, and the other terminal thereof is coupled to the node N10. One terminal of the switch 103 is coupled to the node N10, and the other terminal thereof is coupled to the ground GND. The on/off states of the switches 102 and 103 are controlled by the control signals S105A and S105B, respectively. In the embodiment, the control signals S105A and S105B are generated by the clock control circuit 105. Referring to FIG. 4, the switches 102 and 103 may be implemented as transistors. In detail, the switch 102 is implemented by a PMOS transistor 402, and the switch 103 is implemented by an NMOS transistor 403. The gate of the PMOS transistor 402 receives the control signal S105A, the source thereof is coupled to the voltage source VDD, and the drain thereof is coupled to the node N10. The gate of the NMOS transistor 403 receives the control signal S105B, the drain thereof is coupled to the node N10, and the source thereof is coupled to the ground GND. The PMOS transistor 402 and the NMOS transistor 403 are respectively controlled by the control signals S105A and S105B to be turned on at different times. That is, the on-duration of the PMOS transistor 402 and the on-duration of the NMOS transistor 403 do not overlap. In this way, through charging the capacitor 101 by the voltage source VDD via the turned-on PMOS transistor 402 and discharging the capacitor 101 to the ground GND via the turned-on NMOS transistor 403, a sensing voltage V11 generated at the node N11 changes with the charging and discharging of the capacitor 101 (the change of the sensing voltage V11 is shown in FIG. 5, and a detailed change will be described later). Since the charging/discharging time of the capacitor 101 is affected by the resistance value of the thermistor bolometer $R_{bol}$, the signal or parameter derived from the charging/discharging time of the capacitor 101 is correlated with the temperature of the thermistor bolometer $R_{bol}$.

Referring to FIG. 2 again, the comparison and latch circuit 104 is coupled the node N11 to receive the sensing voltage V11. The comparison and latch circuit 104 compares the sensing voltage V11 with an upper threshold voltage $V_{RH}$ and a lower threshold voltage $V_{RL}$ and generates an enable signal S104 according to the comparison result. Referring to FIG. 4, in an embodiment, the comparison and latch circuit 104 comprises comparators 404A and 404B, an inverter 404C, and an SR flip-flop 404D. The positive input terminal (+) of the comparator 404A receives the upper limit voltage $V_{RH}$, and the negative input terminal (−) thereof receives the sensing voltage V11. The inverter 404C is coupled to the output terminal of the comparator 404A. The comparator 404A generates a corresponding output signal at its output terminal according to the comparison result, and the output signal is inverted by the inverter 404C. The inverted output signal from the inverter 404C serves as the comparison signal S404A. The positive input terminal (+) of the comparator 404B receives the lower threshold voltage $V_{RL}$, and the negative input terminal (−) receives the sensing voltage V11. The comparator 404B generates a comparison signal S404B at its output terminal according to the comparison result. The set terminal (S) of the SR flip-flop 404D receives the comparison signal 5404A, the reset terminal (R) receives the comparison signal S404B, and the output terminal (Q) generates the enable signal S104. According to the operation of the SR flip-flop 404D, each time the signal at the set terminal (S) or the reset terminal (R) is switched from a low voltage level to a high voltage level (that is, each time a rising edge of the comparison signal S404A or S404B occurs), the enable signal S104 at the output terminal (Q) is switched to another voltage level (that is, a rising or falling edge of the enable signal S104 occurs). For example, the enable signal S104 is switched to a high voltage level from a low voltage level (rising edge) or to a low voltage level from a high voltage level (falling edge).

As shown in FIG. 2, the clock control circuit 105 receives the enable signal S104 and generates the control signals S105A and S105B according to the enable signal S104. As described above, in order to make the sense voltage V11 changing with the charging/discharging of the capacitor 101 to further obtain signals or parameters correlated with the temperature of the thermistor bolometer $R_{bol}$, the PMOS transistor 402 and the NMOS transistor 403 cannot be turned on simultaneously. Therefore, the duration in which the control signal S105A is at a low voltage level to turn on the PMOS transistor 402 does not overlap the duration in which the control signal S150B is at a high voltage level to turn on the NMOS transistor 403, as shown in FIG. 4. Referring to FIG. 4, the clock control circuit 105 comprises a non-overlapping clock generator 405. The non-overlapping clock generator 405 receives the enable signal S104 and generates the control signals S105A and S105B according to the enable signal S104. As described above, the comparison and latch circuit 104 generates the comparison signals 5404A and 5404B by comparing the sensing voltage V11 with the upper limit voltage $V_{RH}$ and the lower limit voltage $V_{RL}$. Therefore, the period of time between the time point when a rising edge of the comparison signal S404A occurs and the time point of a rising edge of the comparison signal S404B occurs represents the charging/discharging time of the sensing voltage V11. As such, the period of the enable signal S104 may indicate the charging/discharging time of the sensing voltage V11, that is, the period of the enable signal S104 is correlated with the temperature of the thermistor bolometer $R_{bol}$.

In the embodiment, the non-overlapping clock generator 405 uses a pulse of the enable signal S104 (for example, a portion at the high voltage level) as a basis for the occurrence of the pulses of the control signals S105A and S105B. Referring to FIG. 5, after the enable signal S104 is switched to the high voltage level from the low voltage level (rising edge) at the time point t1, the control signal S150A is switched to the high voltage level from the low voltage level at the time point t2, and then the control signal 5150B is switched to the high voltage level from the low voltage level at the time point t3. After the enable signal S104 is switched to the low voltage level from the high voltage level (falling edge) at the time point t5, the control signal S150B is switched to the voltage level from the high voltage level at the time point t6, and then the control signal S150A is switched to the low voltage level from the high voltage level at the time point t7. In other words, after a rising edge of the enable signal S104 occurs, the rising edge of the control signal S105A and the rising edge of the control signal S105B occur sequentially; after the falling edge of the enable signal S104 occurs, the falling edge of the control signal S105B and the falling edge of the control signal S105A occur sequentially. As a result, the duration (for example, from the time point t7 to the time point t10) in which the control signal S105A is at the low voltage level (for example, the period from the time point t7 to the time point t10) does not overlap the duration (for example, the time point t3 to the time point t6) in which the control signal S150B is in the high voltage level. As described above, since the non-overlapping clock generator 405 generates the control signals S105A and S105B according to the enable signal S104, the periods of the control signals S105A and S105B may indicate the charging/discharging time of the sensing voltage V11, that is, both the periods of the control signals S105A and S105B are correlated with the temperature of the thermistor bolometer $R_{bol}$. According to FIG. 5, each of the control signals S105A and S105B is switched between a high voltage level and a low voltage level, and thus, the control signals S105A and S105B are signals in a digital form (digital signals).

Referring to FIG. 4, in the embodiment, since the period of the control signal S105A is correlated with the temperature of the thermistor bolometer $R_{bol}$, the control signal S105A serves as a digital sensing signal which represents the temperature of the thermistor bolometer $R_{bol}$. The frequency-division circuit 110 in the digital output circuit 11 receives the control signal S105A (that is, the digital sensing signal) and performs a frequency-division operation on the control signal S105A with a frequency-division parameter to generate a frequency-division signal S110. The frequency-division parameter is determined or controlled by a frequency-division control signal S121 generated by the digital control circuit 12. Referring to FIG. 4, the frequency-division circuit 110 comprises a plurality of frequency dividers 420 which are connected in series and further comprises a multiplexer (MUX) 421. In the embodiment, sixteen divide-by-2 frequency dividers 420_1~420_16 are taken as an example for description. The frequency dividers 420_1~420_16 divide the frequencies of its received input signals by a value of 2 (referred to as a frequency-division sub-parameter) to generate respective output signals S420_1~S420_16, respectively. The first one 420_1 among the frequency dividers 420_1~420_16 receives the control signal S105A as its input signal, and each of the other frequency dividers 420_2~420_16 receives the output signal of the previous frequency divider as its input signal. The output signals S420_1~S420_16 are transmitted to the input terminals of the multiplexer 421. The multiplexer 421 is controlled by the frequency-division control signal S121 generated by the digital control circuit 12 and selects one of the output signals S420_1~S420_16 as the frequency-division signal S110. According to the above description, the adjustment of the frequency-division parameter by the digital control circuit 12 can be achieved through controlling the multiplexer 421 by the frequency-division control signal S121. For example, when the multiplexer 421 selects the output signal S420_1 as the frequency-division signal S110 according to the frequency-division control signal S121, the frequency-division parameter is 2, that is, the frequency of the control signal S105A is divided by 2; when the multiplexer 421 selects the output signal S420_3 as the frequency-division signal S110 according to the frequency-division control signal S121, the frequency-division parameter is 8 ($2^3$), that is, the frequency of the control signal S105A is divided by 8. According to the above description, the period of the control signal S105A is correlated with the temperature of the thermistor bolometer $R_{bol}$. Thus, even if the period of the frequency-division signal S110 which is obtained by performing the frequency division on the control signal S105A becomes larger, the period of the frequency-division signal S110 is still correlated with the temperature of the thermistor bolometer $R_{bol}$.

After obtaining the frequency-division signal S110, the half-period generator 111 generates a half-period signal S111 according to the frequency-division signal S110. The pulse duration of the half-period signal S111 is equal to a half of the period of the frequency-division signal S110 and is correlated with the temperature of the thermistor bolometer $R_{bol}$. Next, the counter 112 receives the half-period signal S111. The counter 112 counts the pulse duration of the half-period signal S111 based on the clock signal CLK to generate a half-period count value D112. In the embodiment, the half-period count value D112 is a 16-bit value, the target precision of the half-period count value D112 is 13 bits. The switch 113 is controlled by a switch control signal S120 generated by the digital control circuit 12. When the switch 113 is turned on according to the switch control signal S120, the half-period count value D112 is transmitted to the digital control circuit 12. Since the pulse duration of the half-period signal S111 is correlated with the temperature of the thermistor bolometer $R_{bol}$, the half-period count value D112 which is obtained by counting the pulse duration is also correlated with the temperature of the thermistor bolometer $R_{bol}$, so that the digital control circuit 12 can determine the temperature of the thermistor bolometer $R_{bol}$ according to the half-period count value D112.

In the following, the operation of the sensing circuit 10 and the digital output circuit 11 will be described in detail through FIGS. 4 and 5.

Referring to FIG. 5, at the time point t0, the PMOS transistor 402 is turned on according to the control signal S105A with the low voltage level, and the N-type transistor 403 is turned off according to the control signal S105B of the low voltage level, so that the sensing voltage V11 gradually rises as the capacitor 101 is charged by the voltage source VDD. In the embodiment, since the thermistor bolometer $R_{bol}$ and the capacitor 101 form an RC charging or discharging signal path. The charging/discharging time of the RC circuit is affected by the resistance value of the thermistor bolometer $R_{bol}$, that is, the slop by which the sensing voltage V11 gradually rises is correlated with the resistance value of the thermistor bolometer $R_{bol}$. Once the sensing voltage V11 exceeds the upper threshold voltage $V_{RH}$ (for example, at time t1), the comparison signal S404A switched to the high voltage level through the operations of the comparator 404A and the inverter 404C. At this time, the enable signal S104 generated by the SR flip-flop 404D is switched to the high voltage level in response to the rising edge of the comparison signal S404A. The non-overlapping clock generator 405 switches the control signal S105A to the high voltage level from the low voltage level at the time point t2 delayed from the time point t1 in response to the rising edge of the enable signal S104 and switches the control signal S105B to the high voltage level from the low voltage level at the time point t3 delayed from the time point t2. In this way, the PMOS transistor 402 is turned off according to the control signal S150A with the high voltage level at the time point t2, so that the sensing voltage V11 stops rising at the time point t2 and remains at a voltage level until the time point t3. At time point t3, the NMOS transistor 403 is turned on according to the control signal S150B with the high voltage level, so that the capacitor 101 starts being discharge, and the sensing voltage V11 starts dropping.

At the time point t4, the sensing voltage V11 is lower than the upper threshold voltage $V_{RH}$. Through the operations of the comparator 404A and the inverter 404C, the comparison signal S404A is switched to the low voltage level. The sensing voltage V11 gradually decreases, and the slop by which the sensing voltage V11 gradually decreases is correlated with the resistance value of the thermistor bolometer $R_{bol}$. Once the sensing voltage V11 is lower than the lower threshold voltage $V_{RL}$ (for example, at the time point t5), the comparison signal S404B is switched to the high voltage level by the operation of the comparator 404B. At this time, the enable signal S104 generated by the SR flip-flop 404D is switched to the low voltage level in response to the rising edge of the comparison signal S404B. The non-overlapping clock generator 405 switches the control signal S105B to the low voltage level from the high voltage level at the time point t6 delayed from the time point t5 in response to the falling edge of the enable signal S104 and switches the control signal S105A to the low voltage level from the high voltage level at the time point time t7. In this way, the NMOS transistor 403 is turned off according to the control signal S150B with the low voltage level at the time point t6, so that the sensing voltage V11 stops falling at the time point t6 and remains at a voltage level until the time point t7. At the time point t7, the PMOS transistor 402 is turned on according to the control signal S150A with the low voltage level, so that the capacitor 101 starts being charged, and the sensing voltage V11 starts rising gradually. At the time point t8, the sensing voltage V11 exceeds the lower threshold voltage $V_{RL}$. Through the operation of the comparator 404B, the comparison signal S404B is switched to the low voltage level. After the time point t8, the sensing circuit 10 performs the same operation as described above, and the explanation is omitted here.

The frequency-division circuit 110 divides the control signal S105A (the digital sensing signal). For example, referring to FIG. 4 and FIG. 5, the frequency divider 420_1 divides the control signal S105A by a value of 2 to obtain the output signal S420_1. As such, the period of the output signal S420_1 is twice the period of the control signal S105A. In the embodiment of FIG. 4, it is assumed that the multiplexer 421 selects the output signal S420_1 as the frequency-division signal S110 according to the frequency-division control signal S121. The pulse duration of the half-period signal S111 generated by the half-period generator 111 is equal to a half of the period of the output signal S420_1 and further correlated with the temperature of the thermistor bolometer $R_{bol}$. The counter 112 counts the pulse duration of the half-period signal S111 according to the clock signal CLK to generate the half-period count value D112. The digital control circuit 12 determines the temperature of the thermistor bolometer $R_{bol}$ according to the half-period count value D112.

As described above, according to the frequency-division control signal S121 from the digital control circuit 12, the frequency-division parameter may maintained or be variable (increased or decreased). In an embodiment, the digital control circuit 12 can generate the frequency-division control signal S121 according to a parameter or an instruction which is from a device (for example, the detection circuit 13 or an external device of the sensing device 1) and related to the resolution adjustment. The frequency-division control signal S121 indicates whether to adjust the frequency-division parameter and/or determines the degree (hereinafter referred to as "gain") of adjustment of the frequency-division parameter. In the embodiment of the present invention, the digital control circuit 12 generates one frequency-division control signal S121 to all of the digital output circuits 11, in other words, the multiplexers 421 of all the digital output circuits 11 receive the same frequency-division control signal S121. Therefore, the frequency-division parameters of all the frequency-division circuits 110 are simultaneously adjusted by the same degree. In another embodiment, the digital control circuit 12 generates a respective frequency-division control signal S121 for each digital output circuit 11, so that each frequency-division circuit 110 can be adjusted by a different degree or not adjusted. The adjustment of the frequency-division parameter of one frequency-division circuit 110 will be described an example.

When the digital control circuit 12 generates the frequency-division control signal S121 to indicate that the frequency-division parameter is not adjusted, the digital control circuit 12 determines the temperature of the thermistor bolometer $R_{bol}$ according to on the current half-period count value D112. For example, it is assumed that the 16-bit half-period count value D112 is 6280 ("0001 1000 1000 1000"). In an embodiment, the digital control circuit 12 compares the half-period count value D112 with a set value (such as 6200). When the digital control circuit 12 determines that the half-period count value D112 is larger than the set value (6200), the frequency-division control signal S121 is generated to indicate that the frequency-division parameter is not adjusted. At this time, the digital control circuit 12 determines that the gain is $2^0$ (=1) (that is, the degree of the adjustment of the frequency-division parameter is one time) and generates the frequency-division control signal S121 according to the gain to control the multiplexer 421 not to change the selected output signal. Therefore, the half-period count value D112 is maintained on 6280 (the gain is equal to $2^0$ (=1)), and 6280 serves as a detection count value. In other words, the multiplexer 421 continuously selects the current output signal as the frequency-division signal S110. At this time, the digital control circuit 12 determines the current resistance value of the thermistor bolometer $R_{bol}$ according to the detection count value (=6280) and determines the temperature of the thermistor bolometer $R_{bol}$ according to the determined resistance value.

When the digital control circuit 12 generates the frequency-division control signal S121 to indicate that the frequency-division parameter is adjusted (increased or decreased), the digital control circuit 12 determines the temperature of the thermistor bolometer $R_{bol}$ according to the half-period count value D112 which is obtained after the adjustment. For example, it is assumed that the 16-bit half-period count value D112 is 196 ("0000 0000 1100 0100"). When the digital control circuit 12 determines that the half-period count value D112 is less than the set value (6200), the digital control circuit 12 generates the frequency-division control signal S121 to indicate that the frequency-division parameter will be adjusted and determines that the gain is $2^5$ (=32) (that is, the degree of the adjustment of the frequency-division parameter is 32 times). The digital control circuit 12 generates the frequency-division control signal S121 according to the gain to control the multiplexer 421 to select another output signal (for example, the selected output signal becomes the output signal S420_6 from the output signal S420_1), thereby increasing the frequency-division parameter. At this time, the half-period count value D112 becomes 6272 ("0001 1000 000 0000"), and the resolution of the half-period count value D112 increases by 32 times. After receiving the increased half-period count value D112, the digital control circuit 12 divides the half-period count value D112 (that is 6272) by 32 (corresponding to the degree of the adjustment of the frequency-division parameter), and the result of the division is taken as the detection count value for determine the current resistance value of the thermistor bolometer $R_{bol}$. The temperature of the thermistor bolometer $R_{bol}$ is determined according to the determined resistance value. In the embodiment, the digital control circuit 12 may store the half-period count value D112 ("0001 1000 000 0000") in a built-in register. The integer bits of half-period count values D112 (that is, the first eleven five bits of "0001 1000 000 0000") are stored in an integer portion of the register, and the decimal bits of the half-period count value D112 (that is, the last 5 bits in "0001 1000 000 0000") are stored in the decimal portion of the register.

According to the above embodiments, the digital control circuit 12 dynamically generates and sends the frequency-dividing control signal S121 according to the count value D112 to adjust the frequency-division circuit 110 and its frequency-dividing parameter. Through the adjustment of the gain, a predetermined count value can be obtained, thereby ensuring that that the resolution of the measured resistance and sensed temperature meets the specification.

In the embodiment of the present invention, the digital pixels 300 can be divided into a plurality of active pixels and a plurality of reference pixels. In an embodiment, the reference pixels are located on at least one column of the sensing array 30, for example, the first column C30_1 and/or the last column C30_m, or disclosed on at least one row of the sensing array 30, for example, the first row R30_1 and/or the last row R30_n. In other embodiments, the reference pixels are located at the outermost periphery of the sensing array 30, for example, the periphery formed by the first column C30_1, the last column C30_m, the first row R30_1, and the last row R30_n.

Figure 6:
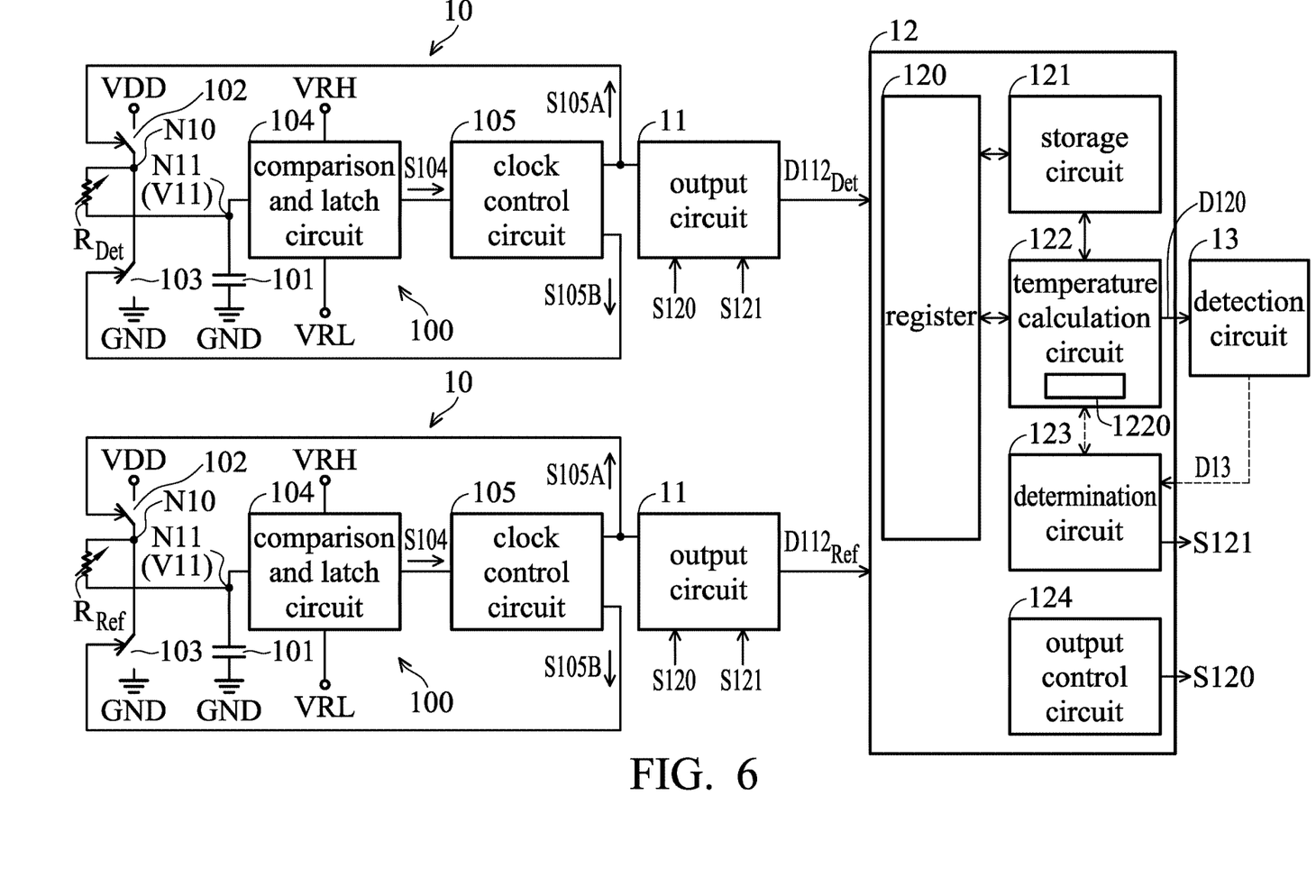
FIG. 6 shows an exemplary embodiment of a digital control circuit.

In the embodiment of the present invention, each reference pixel is shielded so that is does not absorb infrared radiation from the target object. The thermistor bolometer of each reference pixel is located on the substrate 3. The temperature of the thermistor bolometer only changes with the temperature of the substrate region, and the resistance value of the thermistor bolometer changes with its temperature. Therefore, the corresponding half-period count value of each reference pixel is correlated with the temperature of the corresponding substrate region. Each of the active pixels in the embodiment of the present invention is not shielded. The temperature of the thermistor bolometer of each active pixel changes with the infrared radiation which is absorbed by the thermistor bolometer, and the resistance value of the thermistor bolometer changes with its temperature. In detail, for each active pixel, the infrared radiation absorbed by the thermistor bolometer includes infrared radiation from a substrate region where the thermistor bolometer is located on the substrate 3 and infrared radiation from a to-be-detected-region of the object in the space, so that the temperature of the thermistor bolometer varies with the temperature of the corresponding substrate region and the temperature of the to-be-detected region. Therefore, the corresponding half-period count value of each active pixel is correlated with not only the temperature of the corresponding substrate region, but also the temperature of the corresponding to-be-detected region. Referring to FIG. 6, the thermistor bolometer $R_{bol}$ corresponding to one active pixel is used as an active thermistor blometer (active infrared thermosensitive element), represented by the symbol $R_{Det}$, and the thermistor bolometer $R_{bol}$ corresponding to one reference pixel is used as a reference thermistor bolometer (reference infrared thermosensitive element), represented by the symbol $R_{Ref}$. In order to clearly describe the operation of the digital control circuit 12 in the following parameters, only one active pixel and one reference pixel are shown in FIG. 6, wherein the active thermistor bolometer of the active pixel is represented by the symbol $R_{Det}$ and the corresponding half-period count value D112 is represented by $D112_{Det}$, the reference thermistor bolometer of the reference pixel is represented by the symbol $R_{Ref}$ and the corresponding half-period count value D112 is represented by $D112_{Ref}$.

FIG. 6 also shows the digital control circuit 12 according to the present invention. Referring to FIG. 6, the digital control circuit 12 comprises a register 120, a storage circuit 121, a temperature calculation circuit 122, a determination circuit 123, and an output control circuit 124. The register 120 stores the half-period counter values D112 from all of the digital output circuits 11. The temperature calculation circuit 122 comprises a register 1220 that stores a lookup table, wherein the lookup table records different resistance values and corresponding temperature values. In order to clearly describe the operation of the digital control circuit 12, in FIG. 6, $D112_{Det}$ and $D112_{Ref}$ respectively represent the half-period count value of one active pixel and the half-period count value of one reference pixel respectively. The storage circuit 121 stores a plurality of calibration curves corresponding to a thermistor bolometer, and each calibration curve is presented in a temperature-time relationship. For each thermistor bolometer, the corresponding calibration curves correspond to different temperature of the substrate 3, respectively. The temperature calculation circuit 122 is coupled to the register 120 and the storage circuit 121. The temperature calculation circuit 122 reads the half-period count values D112 (including $D112_{Det}$ and $D112_{Ref}$) from the register 120 and obtains the temperature values D120 corresponding to the thermistor bolometers $R_{bol}$ (including $R_{Det}$ and $R_{Ref}$) according to the half-period count values D112. In one embodiment, the temperature calculation circuit 122 reads the half-period count value $D112_{Ref}$ corresponding to one reference thermistor bolometer $R_{Ref}$ from the register 120 and determines a corresponding resistance value according to the half-period count value $D112_{Ref}$, and then checks the lookup table according to the determined resistance value to obtain a corresponding temperature value D120 which indicates the temperature of the corresponding substrate region. In another embodiment, the temperature calculation circuit 122 reads the half-period count value $D112_{Ref}$ corresponding to one reference thermistor bolometer $R_{Ref}$ and the half-period count value $D112_{Det}$ corresponding to one active thermistor bolometer $R_{Det}$ from the register 120, wherein the position of the reference thermistor bolometer $R_{Ref}$ on the substrate 3 is close to the active thermistor bolometer $R_{Det}$ on the substrate 3, in other words, the reference thermistor bolometer $R_{Ref}$ is close to the substrate region corresponding to the active thermistor bolometer $R_{Det}$. The temperature calculation circuit 122 performs a subtraction operation on the read half-period count values $D112_{Det}$ and $D112_{Ref}$ to obtain a corresponding count difference value and determines a corresponding resistance value according to the obtained count difference value. Then, the temperature calculation circuit 122 checks the lookup table according to the determined resistance value to obtain a corresponding temperature value D120 which indicates the temperature of the corresponding to-be-detected region.

According to an embodiment of the invention, the active pixels on the same row or the same column of the sensing array 30 collectively correspond to a reference pixel. In this example, when the temperature calculation circuit 122 wants to calculate the temperature values of the active pixels corresponding to the same row or the same column, the above-described subtraction operation is performed by using the half-period count value of the reference pixel which the active pixels on the same row or column collectively correspond to. According to another embodiment of the present invention, the sensing array 30 is divided into a plurality of regions, and there is a reference pixel in each one region. In this example, when the temperature calculation circuit 122 wants to calculate the temperature values of the active pixels in the same region, the above-described subtraction operation is performed using the half-period count value of the reference pixel in the same region.

When the temperature calculation circuit 122 calculates the temperature values D120 corresponding to the thermistor bolometers $R_{bol}$ (including $R_{Det}$ and $R_{Ref}$), the temperature calculation circuit 122 may selectively output only the temperature value D120 corresponding to the active thermistor bolometer $R_{Det}$ to the detection circuit 13 or output temperature values D120 corresponding to the thermistor bolometers $R_{Det}$ and $R_{Ref}$ to the detecting circuit 13. The detection circuit 13 determines the infrared thermal image of at least one to-be-detected object in the space according to the temperature value D120 corresponding to the active thermistor bolometer $R_{Det}$. Through the operation of the sensing device 1 during a plurality of frames, the detection circuit 13 can determine the thermal dynamic characteristics of the to-be-detected object, such as the movement of the to-be-detected object, according to the temperature values obtained during the frames. The detection circuit 13 can also determine the resolution applied for sensing temperatures according to the infrared thermal image of the to-be-detected object.

According to the above description, the adjustment of the frequency-division parameter is determined based on the frequency-division control signal S121. In an embodiment, referring to FIG. 6, the detection circuit 13 can generate a signal D13 (for example, a parameter or an instruction) according to the resolution applied for sensing temperature, and transmit the signal D13 to the determination circuit 123. The determination circuit 123 generates the frequency-division control signal S121 according to a parameter or instruction indicated by the signal D13 and provides the frequency-division control signal S121 to the multiplexers 421 of all the digital output circuits 11. For example, if the detection circuit 13 determines that the resolution applied for sensing temperature is high, the signal D13 indicates a decrease in the resolution, and the determination circuit 123 generates the frequency-division control signal S121 to control the frequency-division circuit 110 to decrease the frequency-division parameter. That is, the multiplexers 421 are controlled to select the output signals, which are generated by less frequency dividers, as the frequency-division signals S110, respectively. Thus, the temperature values can be determined in a shorter time. If the detection circuit 13 determines that resolution applied for sensing temperature is insufficient, the signal D13 indicates an increase in the resolution, and the determination circuit 123 generates the frequency-division control signal S121 to control the frequency-division circuit 110 to increase the frequency-division parameter. That is, the multiplexers 421 are controlled to select the output signals, which are generated by more frequency dividers, as the frequency-division signals S110, respectively. In another embodiment, the detection circuit 13 generates the signal S13 the according to the application of the sensing device 1 or according to the thermal dynamic characteristics of the to-be-detected object to adjust the resolution applied for sensing temperature and the sensing speed. For example, if the application of the sensing device 1 is for detection of driving thermal images or detection of a fast moving object, the sensing speed must be increased. At this time, the detection circuit 13 provides the signal D13 to the determination circuit 123, and the determination circuit 123 generates the frequency-division control signal. S121 for decreasing the frequency-division parameter of the frequency-division circuit 110. In the cases where the detection circuit 13 itself has a high operation speed and a high data transmission rate, the change in the temperature of the pixels can be calculated and the thermal dynamic characteristics of the to-be-detected object can be determined in real time by instantaneously and massively collecting the sensing data of the pixels. In another example, if the application of the sensing device 1 is for the detection of temperature distribution of a human body or if the to-be-detected object is almost still, the sensing speed can be lowered to obtain a high resolution applied for sensing temperature. Thus, the determination circuit 123 generates the frequency-division control signal S121 to increase the frequency-division parameter of the frequency-division circuit 110 thereby the resolution applied for sensing temperature.

According to an embodiment of the invention, the output control circuit 124 generates the switch control signal S120 to the digital output circuits 11 to control all of the switches 113, that is, to control the timing at which the digital output circuits 11 outputs the half-period count values D112. For example, the half-period count values D112 are output to the digital control circuit 12 in a parallel or serial manner.

In general, temperature of a thermistor bolometer does not rise to the steady-state temperature immediately after the thermistor bolometer absorbs the infrared radiation, but it gradually rises instead. Especially after at least five thermal time constants of the thermistor bolometer, the temperature of the thermistor bolometer reaches the steady-state temperature. The temperature of the thermistor bolometer at this time is closest to the temperature of the source of the infrared radiation. In the above embodiment, in order to obtain the most accurate temperature of a target region, during each frame, the temperature calculation circuit 122 can read from the register 120 the half-period count value $D112_{Det}$ which is obtained after the thermal time constant after at least five thermal time constants of the thermistor bolometer to obtain a corresponding temperature value. Since the reference thermistor bolometer $R_{Ref}$ is close to the substrate 3 and the change in the temperature of the substrate 3 is small when the sensing device 1 is operating, the temperature calculation circuit 122 can read from the register 120 the half-period count value $D112_{Ref}$ which is obtain at any time during the frame for the above subtraction operation.

Figure 7:
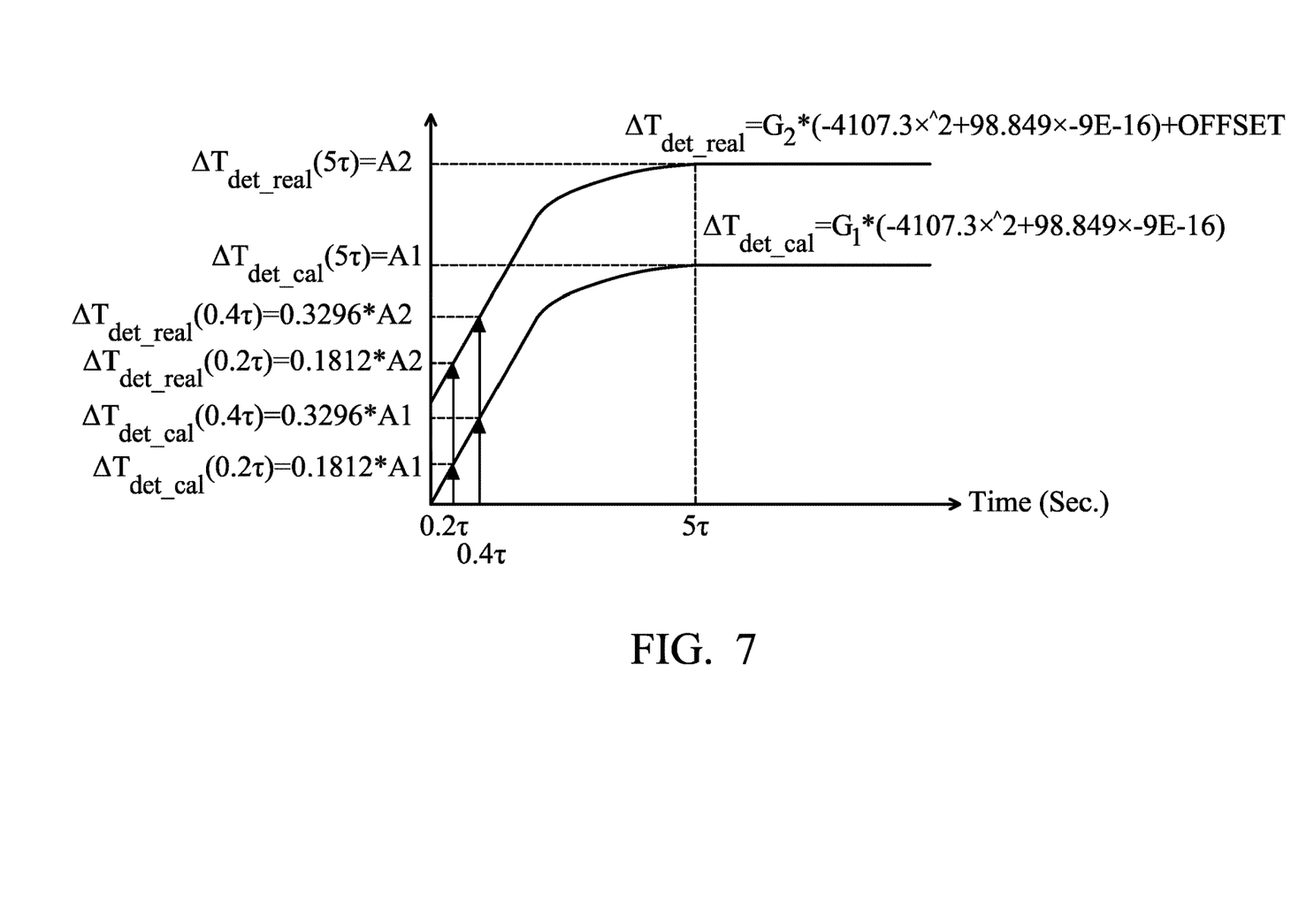
FIG. 7 shows a calibration curve and an actual temperature-time curve for a thermistor bolometer according to an exemplary embodiment of the present invention.

In another embodiment of the present invention, in order to quickly generate a temperature value D120 that reflects a temperature of an object, the present invention provides an approximation technique for a thermal time constant curve to enable the temperature calculation circuit 122 to estimate a steady-state temperature value of a thermistor bolometer in the period of five thermal time constants of the thermistor bolometer. An active thermistor bolometer will be taken as an example to illustrate the approximation technique of the thermal time constant curve and the corresponding operation of the temperature calculation circuit 122. Referring to FIG. 6, during a frame, the temperature calculation circuit 122 reads from the register 120 the half-period count values $D112_{Det}$ which are obtained at the sampling times before the time point (5τ) of the five thermal time constants, for example, at the time points 0τ, 0.2τ, 0.4τ, to obtain the corresponding three temperature values as the sampled real temperature values. Referring to FIG. 7, the temperature value corresponding to the time point 0T is an initial real temperature value, the temperature value corresponding to the time point 0.2τ is $\Delta T_{det\_real}(0.2\tau)$, and the temperature value corresponding to the time point 0.4τ is $\Delta T_{det\_real}(0.4\tau)$. The temperature calculation circuit 122 further reads from the register 120 a half-period count value $D112_{Ref}$ which is obtained at any time point during the frame to obtain a corresponding temperature reference value, and reads from the storage circuit 121 a corresponding calibration curve $\Delta T_{det\_cal}$ according to the temperature reference value. The temperature calculation circuit 122 obtains the temperature values corresponding to the time points 0τ, 0.2τ, and 0.4τ based on the calibration curve, wherein the temperature value corresponding to the time point 0T is an initial calibration temperature value, the temperature value corresponding to the time point of 0.2τ is $\Delta T_{det\_cal}(0.2\tau)$, the temperature value corresponding to the time point 0.4τ is $\Delta T_{det\_cal}(0.4\tau)$, and the temperature value corresponding to the time point 5τ is $\Delta T_{det\_cal}(5\tau)$ and equal to A1. The temperature calculation circuit 122 obtains a real temperature-time curve $\Delta T_{det\_real}$ according to the calibration curve $\Delta T_{det\_cal}$, the initial calibration temperature value, the temperature value the temperature value $\Delta T$ $T_{det\_cal}(0.2\tau)$, $\Delta T_{det\_cal}(0.4\tau)$ the initial real temperature value, the temperature value $\Delta T_{det\_real}(0.2\tau)$, and the temperature value $\Delta T_{det\_real}(0.4\tau)$ an approximate manner. After the real temperature-time curve $\Delta T_{det\_real}$ is obtained, the temperature calculation circuit 122 can estimate the steady-state temperature value $\Delta T_{det\_real}(5\tau)$ (equal to A2) corresponding to the above active thermistor bolometer according to the real temperature-time curve $\Delta T_{det\_real}$ before the time point (5τ) of the five thermal time constants. This steady-state temperature value serves as the temperature value D120 which is output to the detection circuit 13.

In another embodiment, if the digital control circuit 12 has better computing capability, the digital control circuit 12 can utilize a predetermined deep learning model to obtain the real temperature-time curve for each active thermistor bolometer. In this embodiment, the determination circuit 123 is further coupled to the temperature calculation circuit 122. In the following, an active thermistor bolometer is taken as an example to illustrate how to use a predetermined deep learning model to obtain the corresponding real temperature-time curve. During a frame, for an active thermistor bolometer, the temperature calculation circuit 122 reads from the register 120 reads from the register 120 the half-period count values $D112_{Det}$ which are obtained at the sampling times before the time point of the five thermal time constants, thereby obtaining corresponding temperature values as the sampled real temperature values. At this time, the determination circuit 123 receives the sampled real temperature values from the temperature calculation circuit 122 and executes the predetermined deep learning model, which is stored previously, by using the sampled real temperature values to obtain the real temperature-time curve of the active thermistor bolometer by through an approximation manner. Then, the determination circuit 123 provides the real temperature-time curve to the temperature calculation circuit 122. The temperature calculation circuit 122 then estimates the steady-state temperature value of the active thermistor bolometer based on the real temperature-time curve. In this way, during each frame, the steady-state temperature value corresponding to the active thermistor bolometer can be estimated in a short time (in the period of five thermal time constants). The steady-state temperature value serves as the temperature value D120 which is output to the detection circuit 13.

According to various embodiments described above, each pixel of the present invention directly generates a corresponding digital signal through the RC oscillator. Moreover, the sensing device 1 can adjust the sensing resolution according to the characteristics of the to-be-detected object or its capability of processing signals, thereby increasing the sensing speed and/or the sensing accuracy. Furthermore, by using the approximation for the time constant curve of each thermistor bolometer, the embodiments of the present invention can estimate the steady state temperature value of each active thermistor bolometer in a short time (in the period of five thermal time constants), thereby increasing the sensing speed.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sensing device comprising:
a plurality of infrared thermosensitive elements arranged in an array, wherein each of the plurality of infrared thermosensitive elements has a resistance value which changes with a temperature of the infrared thermosensitive element by absorbing infrared radiation and generates a sensing voltage corresponding to the resistance value;
a plurality of resistor-capacitor (RC) oscillators coupled to the plurality of infrared thermosensitive elements to receive the corresponding sensing values, respectively, wherein each of the plurality of RC oscillators generates a digital sensing signal according to the corresponding sensing value to indicate the temperature of the corresponding infrared thermosensitive element, and each of the plurality of RC oscillators is disposed under the corresponding infrared thermosensitive element;
a plurality of digital output circuits coupled to the plurality of RC oscillators to receive the corresponding digital sensing signal respectively, wherein each of the plurality of digital output circuits performs a frequency-division operation on the corresponding digital sensing signal with a frequency-division parameter to generate a frequency-division signal and counts a half of a period of the frequency-division signal to generate a half-period count value; and
a digital control circuit coupled to the plurality of digital output circuits to receive the half-period count values and generating temperature values according to the half-period count values.

2. The sensing device as claimed in claim 1, wherein each of the plurality of infrared thermosensitive elements is implemented by a thermistor bolometer.

3. The sensing device as claimed in claim 1, wherein each of the plurality of digital output circuits comprises:
a frequency-division circuit receiving the corresponding digital sensing signal and performing the frequency-division operation on the corresponding digital sensing signal with the frequency-division parameter to generate the corresponding frequency-division signal;
a half-period generator generating a half-period signal according to the corresponding frequency-division signal, wherein a pulse duration of the half-period signal is equal to the half of the period of the frequency-division signal; and
a counter receiving the half-period signal and counting the pulse duration of the half-period signal according to a clock signal to generate the corresponding half-period count value.

4. The sensing device as claimed in claim 1, wherein the digital control circuit comprises:
an output control circuit, coupled to the plurality of digital output circuits, controlling timing at which the plurality of digital output circuits output the corresponding half-period count values.

5. The sensing device as claimed in claim 1, wherein the frequency-division parameter is variable and determined by the digital control circuit.

6. The sensing device as claimed in claim 1,
wherein the plurality of infrared thermosensitive elements comprise a plurality of active infrared thermosensitive elements and a plurality of reference infrared thermosensitive elements, and
wherein for each of the plurality of active infrared thermosensitive elements, the digital control circuit performs a subtraction operation on the corresponding half-period count value and the half-period count value corresponding to one of the plurality of reference infrared thermosensitive elements to obtain a count difference value and obtains the corresponding temperature value according to the count difference value.

7. The sensing device as claimed in claim 6, wherein the array is disposed on a substrate, the plurality of reference infrared thermosensitive elements sense temperature of the substrate, and the digital control circuit operates during a plurality of frames and comprises:
a storage circuit storing a plurality of calibration curves related to a temperature-time relationship of each of the plurality of infrared thermosensitive elements, wherein the plurality of calibration curves for each of the plurality of infrared thermosensitive elements correspond to different temperature of the substrate; and
a temperature calculation circuit receiving the half-period count values and obtaining the temperature values each corresponding to one of the plurality of active infrared thermosensitive elements through the subtract operation,
wherein for each of the plurality of reference infrared thermosensitive elements, the temperature calculation circuit obtains the corresponding temperature value according to the corresponding half-period value to indicate a temperature of a substrate region of the substrate,
wherein during each of the plurality of frames, for each of the plurality of active infrared thermosensitive elements, the temperature calculation circuit reads the corresponding calibration curve from the storage circuit according to the temperature value of the corresponding reference infrared thermosensitive element, and
wherein during each of the plurality of frames, for each of the plurality of active infrared thermosensitive elements, the temperature calculation circuit obtains the temperature values each corresponding to one of a plurality of sampling time and serving as a sampled real temperature value, obtains a real temperature-time curve of the active infrared thermosensitive element according to the obtained sampled real temperature values and the corresponding calibration curve, and estimates a steady-state temperature value of the active infrared thermosensitive element according to the obtained real temperature-time curve.

8. The sensing device as claimed in claim 7, wherein during each of the plurality of frames, for each of the plurality of active infrared thermosensitive elements, the plurality of sampling times occur before five thermal time constants of the active infrared thermosensitive element.

9. The sensing device as claimed in claim 6, wherein the digital control circuit operates during a plurality of frames and comprises:
a temperature calculation circuit, coupled to the plurality of digital output circuits, receiving the half-period count values and obtaining the temperature values through the subtract operation, wherein during each of the plurality of frames, for each of the plurality of active infrared thermosensitive elements, the temperature calculation circuit obtains the temperature values each corresponding to one of a plurality of sampling times and serving as a plurality of sampled real temperature values; and a determination circuit, coupled to the temperature calculation circuit, receiving the plurality of sampled real temperature values, wherein during each of the plurality of frames, for each of the plurality of active infrared thermosensitive elements, the determination circuit performs a predetermined deep learning model according to the corresponding plurality of sampled real temperature values to obtain a real temperature-time curve of the active infrared thermosensitive element and estimates a steady-state temperature value of the active infrared thermosensitive element according to the obtained real temperature-time curve.

10. The sensing device as claimed in claim 6, wherein the digital control circuit determines a gain which indicates a degree of adjustment of the frequency-division parameter according to a signal and generates a frequency-division control signal according to the determined gain to determine the frequency-division parameter; and wherein for each of the plurality of active infrared thermosensitive elements, the digital control circuit performs a division operation on the corresponding count difference value according to the gain to obtain a detection count value and determines the corresponding temperature value according to the detection count value.

11. The sensing device as claimed in claim 1, wherein each of the plurality of RC oscillators comprises:

a first switch coupled between a voltage source and a first node and controlled by a first control signal;

a second switch coupled between the first node and a ground and controlled by a second control signal, wherein the corresponding infrared thermosensitive element is coupled between the first node and a second node;

a capacitor coupled between the second node and the ground, wherein a sensing voltage is generated at the second node;

a comparison and latch circuit receiving the sensing voltage and comparing the sensing voltage with an upper threshold voltage and a lower threshold voltage to generate a first comparison signal and a second comparison signal, wherein the first comparison signal represents a comparison result between the upper threshold voltage and the sensing voltage, the second comparison signal represents a comparison result between the lower threshold voltage and the sensing voltage, and the comparison and latch circuit comprises:

an SR flip-flop having a set terminal receiving the first comparison signal, a reset terminal receiving the second comparison signal, and an output terminal generating an enable signal; and a clock control circuit receiving the enable signal and generating the first control signal and the second control signal according to the enable signal, wherein a first duration in which the first switch is turned on by the first control signal does not overlap a second duration in which the first switch is turned on by the first control signal, and wherein the first control signal serves as the digital sensing signal.

12. The sensing device as claimed in claim 11, wherein for each of the plurality of RC oscillators, the clock control circuit comprises:

a non-overlapping clock generator receiving the enable signal and generating the first control signal and the second control signal according to a plurality of pulses of the enable signal, wherein the first control signal is at a low voltage level in the first duration to turn on the first switch, and the second control signal is at a high voltage level in the second duration to turn on the second switch.

13. The sensing device as claimed in claim 1, further comprising:

a substrate; and a semiconductor layer, stacked above the substrate, forming the plurality of infrared thermosensitive elements;

wherein the plurality of RC oscillator circuits are disposed between the semiconductor layer and the substrate.

* * * * *